# 3,117,976
N-ALKYL-PYRROLIDINE-2-METHANOL, α-CYCLOHEXYL MANDELATES

Minoo Dossabhoy Mehta, London, and Robert Michael Quinton, Betchworth, England, assignors to Beecham Research Laboratories Limited, Betchworth, England, a British company
No Drawing. Filed Nov. 12, 1958, Ser. No. 773,196
6 Claims. (Cl. 260—326.3)

This invention relates to basic esters and to their acid addition and quaternary salts.

The present invention provides new compounds of the general formula:

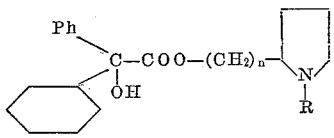
(I)

where R is an alkyl group having from 1 to 4 carbon atoms and $n$ is 1, 2, 3 or 4, and acid addition and quaternary salts thereof.

The abbreviation "Ph" is used herein for the phenyl group.

Compounds with which the present invention is particularly concerned are compounds of the general Formula I where R is a methyl or ethyl group (especially a methyl group) and $n$ is 1 or 2, and acid addition and quaternary salts thereof. The members of this latter class of compounds which are of particular interest are (1-methyl-2-pyrrolidyl)methyl phenylcyclohexylglycollate and its acid addition and quaternary salts. As an example of one of these quaternary salts, (1-methyl-2-pyrrolidyl)methyl phenylcyclohexylglycollate methobromide has been shown to possess particularly useful properties as a spasmolytic, especially in that its effect is remarkably long-lasting.

Since the compounds of the present invention contain asymmetric centres they can exist in several optically active forms and the present invention extends to these optically active forms as well as to the corresponding racemic mixtures. For example, the hydrochloride of (1-methyl-2-pyrrolidyl)methyl phenylcyclohexylglycollate is separable, by crystallisation from suitable solvents, into two optically inactive (DL) forms. Both of these forms may be converted into quaternary derivatives having the same desirable long-lasting spasmolytic properties.

The present invention also provides a process for the preparation of compounds of the general Formula I, in which an ester of the general formula:

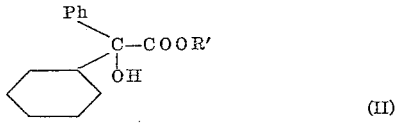
(II)

where R' is an alkyl group having from 1 to 4 carbon atoms (especially a methyl group) is reacted with an alcohol of the general formula:

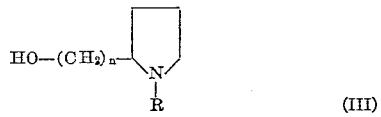
(III)

where R is an alkyl group having from 1 to 4 carbon atoms and $n$ is 1, 2, 3 or 4. This reaction can conveniently be achieved by heating the reactants in a suitable solvent, e.g. light petroleum or n-heptane, in the presence of a small proportion of an alkali metal alkoxide, for example a sodium alkoxide such as sodium methoxide.

The present invention also includes a process for the preparation of compounds of the general Formula I, in which an alcohol of the general Formula III is reacted with phenylcyclohexylchloracetyl chloride and the resultant product treated with water and a base.

The present invention further provides a process for the preparation of compounds of the general Formula I, in which phenylcyclohexyl glycollic acid is reacted with an alkyl halide of the general formula:

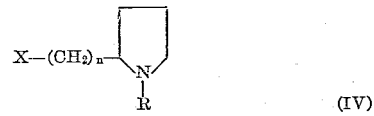
(IV)

where R is an alkyl group having from 1 to 4 carbon atoms, $n$ is 1, 2, 3 or 4 and X is an atom of chlorine or bromine, to form a compound of the general formula:

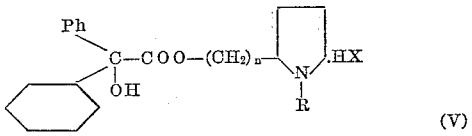
(V)

which is then converted into a compound of the general Formula I, for example by treatment with a base.

Alternatively, the phenylcyclohexyl glycollic acid in the process described above can be replaced by one of its salts, preferably a salt of an alkali metal, for example sodium, and when this is done a compound of the general Formula I is obtained directly and not, as described above, in the form of a hydrohalide salt. In practice, a hydrohalide salt is often more desirable than the corresponding free base and thus it is usually preferable to use the process which provides the hydrohalide salt directly.

The anion of the salts of this invention can be chosen from any of the usually acceptable anions, for example, halide, sulphate, citrate or tartrate, the choice depending to a large extent upon pharmaceutical convenience and the physical properties which it is desired the salt to possess, for example, stability or solubility. Of course, toxic anions, for example the oxalate ion, should be avoided. Where the salt is an acid addition salt derived from an organic acid it is preferably prepared by treating the corresponding free base with the appropriate organic acid in a suitable solvent.

The quaternary salts of this invention can readily be obtained from the compounds of the general Formula I by conventional means. Quaternary salts derived from organic acids can be prepared directly from the corresponding halide salt by treating the latter with the silver salt of the appropriate organic acid.

The following examples illustrate the invention:

Example 1

This example describes the preparation of (1-methyl-2-pyrrolidyl)methyl phenylcyclohexylglycollate hydrochloride and its separation into two (DL)-forms.

A methanolic solution of sodium methoxide [from sodium (0.6 g.) and methanol (15 ml.)] was added dropwise during 3 hours to a boiling solution of methyl phenylcyclohexylglycollate (33.7 g.) and 1-methyl-2-hydroxymethylpyrrolidine (23.4 g.) in heptane (400 ml.) and the methanol that separated was removed by means of a Dean and Stark apparatus. At the end of 4 hours no further separation of methanol occurred and the solvent was removed under reduced pressure. The residue was dissolved in ether and the ethereal solution, after washing with water (3 x 50 ml.), was extracted with 5N hydrochloric acid (3 x 100 ml.). The hydrochloride (35.5 g., 71%) crystallised out of the acid extract as colourless needles, M.P. 181–196° C. Extraction of this hydrochloride (33 g.) with hot ethanol (150 ml.) left the sparingly soluble (1-methyl-2-pyrrolidyl)methyl phenylcyclohexylglycollate hydrochloride (α-form) (7.6 g.) M.P. 220–222° C. as a residue. The readily soluble (1-methyl - 2 - pyrrolidyl)methyl phenylcyclohexylglycollate hydrochloride (β-form) (22 g.), M.P. 199–201° C., was obtained from the ethanol extract on cooling.

The 1-methyl-2-hydroxymethylpyrrolidine used in this example was prepared as follows:

To an ethanolic solution of methylamine (200 g. of 33% w./v. corresponding to 6 mols.) in a flask fitted with a brine condenser and carbon dioxide/acetone trap, was added dibromoamyl acetate (100 g.). After some 10 minutes a vigorous reaction took place and the reaction boiled. When this initial reaction had subsided the mixture was heated under reflux for 6 hours. The alcohol was distilled off at atmospheric pressure and sodium hydroxide solution was added (120 ml. of 25%), the mixture heated for a further hour and then extracted continuously with ether. The ether after drying with magnesium sulphate was removed and the residue fractionally distilled under reduced pressure to give 1-methyl-2-hydroxymethylpyrrolidine.

*Example 2*

This example describes the preparation of (1-methyl-2-pyrrolidyl)methyl phenylcyclohexylglycollate hydrochloride by an alternative route.

1-Methyl-2-hydroxymethylpyrrolidine (5 g.) in dry butanone (10 ml.) was added to a solution of phenylcyclohexylchloroacetyl chloride (13 g.) in dry butanone (20 ml.) and the mixture refluxed for 1 hour. The solvent was then removed in vacuo and the residue dissolved in water. The aqueous solution after extraction with ether (2 x 25 ml.) was heated on a steam bath at 85° C. for 1 hour and then cooled to give a solid which was filtered off, washed with water and dried. The yield of hydrochloride was 7 g. (44%), M.P. 194–208° C.

The phenylcyclohexylchloroacetyl chloride used in the above example was prepared by the action of phosphorous pentachloride on phenylcyclohexylglycollic acid. The 1-methyl-2-hydroxymethylpyrrolidine was prepared as described in Example 1.

*Example 3*

This example describes the preparation of (1-methyl-2 - pyrrolidyl)methyl phenylcyclohexylglycollate hydrochloride by a further alternative method.

A solution of phenylcyclohexylglycollic acid (13.8 g.) and 1-methyl-2-chloromethylpyrrolidine (8.6 g.) in dry isopropanol (15 ml.) was refluxed for 24 hours. On cooling the mixture (1-methyl-2-pyrrolidyl)methyl phenylcyclohexylglycollate hydrochloride (8.3 g., 39%), M.P. 193–200° C., separated out.

The 1-methyl-2-chloromethylpyrrolidine used in this example was obtained as a colourless liquid, B.P. 45–46° C./14 mm. by the action of thionyl chloride on 1-methyl-2-hydroxymethylpyrrolidine. The latter was obtained as described in Example 1.

*Example 4*

This example describes the preparation of (1-methyl-2-pyrrolidyl)methyl phenylcyclohexylglycollate methobromide from the hydrochlorides described in Example 1.

(*a*) The ester hydrochloride (mixed isomers, M.P. 181–196° C., 15 g.) was dissolved in water, basified with sodium hydroxide solution and the resultant oil extracted into ether. The extracts were dried over magnesium sulphate, the ether evaporated and the residue dissolved in acetone (100 ml.). Methyl bromide (7.8 g., 2 mole) was added to the acetone solution and the mixture warmed on a steam bath for 15 minutes. The solution was cooled and the solid filtered off, washed with a little acetone and dried to give the methobromide, M.P. 176–180° C., (16 g., 92%).

(*b*) Following exactly the same procedure the ester hydrochloride, M.P. 220–222° C. (α-form) was converted into a methobromide, M.P. 185–186° C. (86%).

(*c*) Similarly, the ester hydrochloride, M.P. 199–201° C. (β-form) gave a crude methobromide, M.P. 180–195° C. in quantitative yield. Recrystallisation from ethanol/ether gave a methobromide, M.P. 199.5–201° C., (95%).

*Example 5*

This example describes the preparation of (1-methyl-2 - pyrrolidyl)methyl phenylcyclohexylglycollate methyl methosulphate.

A solution of the free base in acetone (25 ml.) was prepared as in Example 4(*a*) from the hydrochloride, M.P. 181–196° C. (3.5 g.). Dimethyl sulphate (2.4 g., 2 mole) was added and the mixture warmed on the steam bath for 15 minutes. After cooling and dilution with an equal volume of ether, the solid was filtered off and recrystallised from acetone/ethanol to give the methosulphate as colourless crystals, M.P. 118–119° C. (2.1 g., 42%).

*Example 6*

This example describes the preparation of (1-methyl-2 - pyrrolidyl)methyl phenylcyclohexylglycollate methiodide.

A solution of the free base in benzene was prepared as in Example 4(*a*) from the hydrochloride, M.P. 181–196° C. Methyl iodide (2 mole) was added and after 24 hours at room temperature the benzene was decanted and the residual gum triturated with ethanol to give the methiodide, M.P. 179–180° C. (29%).

*Example 7*

This example describes the preparation of (1-ethyl-2-pyrrolidyl)methyl phenylcyclohexylglycollate and its hydrochloride.

Sodium (0.1 g.) dissolved in methanol (4 ml.) was slowly added to a boiling solution of methyl phenylcyclohexylglycollate (7.7 g.) and 1-ethyl-2-hydroxymethylpyrrolidine (5.0 g.) in light petroleum (125 ml., B.P. 80–100° C.). The methanol that separated was collected in a Dean and Stark apparatus. After refluxing for 5 hours the solution was cooled, washed with water and then extracted with 5N hydrochloric acid (3 x 30 ml.). The acid extracts were basified with aqueous 5N sodium hydroxide solution and the precipitated oil extracted into ether. The ether extracts after drying were evaporated and the residual oil distilled to give (1-ethyl-2-pyrrolidyl) methyl phenylcyclohexylglycollate (7.3 g., 66%) as a pale yellow viscous oil, B.P. 160–165° C./0.15 mm., $n_D^{20}$ 1.5250. The hydrochloride was obtained in the usual way as colourless crystals, M.P. 214–215° C. (from methyl ethyl ketone).

The 1-ethyl-2-hydroxymethylpyrrolidine used in this example was obtained by a process similar to that described in Example 1 but using ethylamine instead of methylamine.

*Example 8*

This example describes the preparation of (1-ethyl-2-pyrrolidyl)methyl phenylcyclohexylglycollate ethobromide.

The free base from Example 7 was boiled under reflux for 18 hours with excess ethyl bromide in benzene solution to give the ethobromide M.P. 210–212° C., crystallised from methyl ethyl ketone.

*Example 9*

This example describes the preparation of 2-(1'-methyl-2'-pyrrolidyl)ethyl phenylcyclohexylglycollate and its hydrochloride.

This was prepared from methyl phenylcyclohexylglycollate (7.8 g.) and 1-methyl-2-(2'-hydroxyethyl)pyrrolidine (5.0 g.) as described in Example 7 to give 2-(1'-methyl - 2' - pyrrolidyl)ethyl phenylcyclohexylglycollate (7.3 g., 67%) as a viscous oil, B.P. 160° C./0.1 mm.

$n_D^{20}$ 1.5261. The hydrochloride prepared in the usual way had M.P. 175–176° C., crystallised from methyl ethyl ketone.

1-Methyl-2-(2-hydroxyethyl)pyrrolidine used in the above and following examples was obtained as follows:

Ethyldiazoacetate (35 g.) was added dropwise to a well-stirred mixture of 1-methylpyrrole (70 g.) and copper bronze (3 g.) heated on a steam bath. The internal temperature of the reaction mixture was maintained at 95–100° C. and after the addition was complete the whole was heated on the steam bath for a further ten minutes and then filtered. The filtrate was then fractionated in vacuo (3–4 mm.) to give a forerun of 1-methylpyrrole (53.2 g.) and then ethyl 1-methyl-2-pyrryl-acetate as a pale yellow oil (18 g.) B.P. 84–88° C./3 mm. The yield taking into account the recovered 1-methylpyrrole was 51% (cf. Nenitzescu and Solomonica, Ber. 1931, 64, 1924).

Ethyl 1-methyl-2-pyrrylacetate (50.7 g.) in glacial acetic acid (75 cc.) was hydrogenated at 45 atmospheres at room temperature for 16 hours in the presence of a platinum oxide catalyst. The catalyst was then removed by filtration and the acetic acid was neutralised using aqueous saturated potassium carbonate solution (ca. 120 cc.). Potassium acetate separated and sufficient anhydrous potassium carbonate (66 g.) was added to saturate the aqueous layer. The inorganic material was removed by filtration and washed with ether (4 x 50 cc.). The filtrate together with the ether washing was separated and the aqueous layer was further extracted with ether (4 x 250 cc.). The combined ether extracts were dried (MgSO$_4$), the ether removed by distillation and the residual oil distilled in vacuo, the fraction (35.5 g.), B.P. 64–67° C./1.5 mm. being collected. On redistillation ethyl 1-methyl-2-pyrrolidyl acetate (34 g., 65%) was obtained as a colourless liquid, B.P. 65–66° C./2.5 mm. $n_D^{19}$ 1.4464 (cf. Sohl and Shriner, J. Amer. Chem. Soc., 1933, 55, 3831).

Lithium aluminium hydride (3.5 g.) was added to dry ether (500 cc.) under an atmosphere of nitrogen and a solution of ethyl 1-methyl-2-pyrrolidyl acetate (14.5 g.) in dry ether (50 cc.) was slowly run in with stirring at such a rate that the ether refluxed gently. After complete addition, (ca. 0.5 hour) the mixture was refluxed with stirring for 0.5 hour and then cooled to 0° C. The complex was then decomposed by the careful addition of water (18 cc.) the mixture being stirred for 0.5 hour to ensure complete decomposition. The ethereal solution was filtered, the inorganic residue was washed with ether (4 x 80 cc.) and the combined filtrate and washings dried (MgSO$_4$). The ether was removed by distillation and the residue on distillation in vacuo gave 1-methyl-2-(2'-hydroxyethyl)pyrrolidine (7.1 g., 65%) as a colourless liquid, B.P. 67° C./1.9 mm. $n_D^{25}$ 1.4698 (cf. Hess et al., Ber., 1915, 48, 1886).

*Example 10*

This example describes the preparation of the compounds described in Example 9 by an alternative route.

A solution of phenylcyclohexylglycollic acid (9.8 g.) and 1-methyl-2-(2'-chloroethyl)pyrrolidine (6.2 g.) in dry isopropanol (25 ml.) was refluxed for 16 hours. The solvent was removed in vacuo and the residue worked up as described in Example 7, to give 2-(1'-methyl-2'-pyrrolidyl)ethyl phenylcyclohexylglycollate (5.9 g., 41%) as a viscous oil, B.P. 160–164° C./0.1 mm. $n_D^{19.5}$ 1.5250. The hydrochloride had M.P. 175° C. and was identical with the one described in the previous example.

*Example 11*

This example describes the preparation of 2-(1'-methyl-2'-pyrrolidyl)ethyl phenylcyclohexylglycollate methiodide.

A solution of 2-(1'-methyl-2'-pyrrolidyl)ethyl phenylcyclohexylglycollate (2.0 g.) and methyl iodide (1.0 ml.) in toluene (75 ml.) was allowed to stand for several days. The toluene was then decanted and the residual gum triturated with ether to give the methiodide (2.8 g., 99%), M.P. 100–106° C., crystallised from a mixture of ethanol and ether.

What we claim is:

1. A compound selected from the group consisting of compounds of the formula:

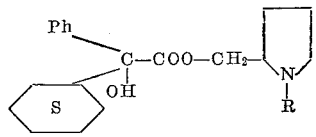

and alkyl halide and dialkyl sulphate salts thereof of 1 to 2 carbon atoms in the alkyl group, where Ph is the phenyl group and R is an alkyl group of 1 to 2 carbon atoms inclusive.

2. (1-Methyl-2-pyrrolidyl)methyl phenylcyclohexylglycollate.

3. (1-Methyl-2-pyrrolidyl)methyl phenylcyclohexylglycollate hydrochloride.

4. (1-Methyl-2-pyrrolidyl)methyl phenylcyclohexylglycollate methosulfate.

5. (1-Methyl-2-pyrrolidyl)methyl phenylcyclohexylglycollate methobromide.

6. (1-Methyl-2-pyrrolidyl)methyl phenylcyclohexylglycollate methiodide.

References Cited in the file of this patent

UNITED STATES PATENTS

| | | |
|---|---|---|
| 1,987,546 | Blankart | Jan. 8, 1935 |
| 2,394,770 | Hill et al. | Feb. 12, 1946 |
| 2,695,301 | Blicke | Nov. 23, 1954 |
| 2,790,787 | Tawney | Apr. 30, 1957 |
| 2,844,591 | Feldkamp et al. | July 22, 1958 |
| 2,918,406 | Biel | Dec. 22, 1959 |
| 2,918,407 | Biel | Dec. 22, 1959 |
| 2,918,408 | Biel | Dec. 22, 1959 |
| 2,928,843 | Metha et al. | Mar. 15, 1960 |

FOREIGN PATENTS

| | | |
|---|---|---|
| 483,258 | Great Britain | Apr. 14, 1938 |
| 624,016 | Great Britain | May 26, 1949 |

OTHER REFERENCES

Biel et al.: "J. Am. Chem. Society," vol. 74, pages 1485–1488, (1952).